(12) United States Patent
Maeda et al.

(10) Patent No.: US 7,762,587 B2
(45) Date of Patent: Jul. 27, 2010

(54) BODY FRAME STRUCTURE OF STRADDLE-TYPE FOUR WHEELED VEHICLE

(75) Inventors: Kazuhiro Maeda, Akashi (JP); Itsuo Takegami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 693 days.

(21) Appl. No.: 11/482,908

(22) Filed: Jul. 10, 2006

(65) Prior Publication Data
US 2007/0007758 A1  Jan. 11, 2007

(30) Foreign Application Priority Data
Jul. 11, 2005  (JP)  ............................. P2005-201458

(51) Int. Cl.
*B62D 21/11* (2006.01)
(52) U.S. Cl. ............................. 280/788; 280/124.109
(58) Field of Classification Search ................. 280/788, 280/124.1, 124.109
See application file for complete search history.

(56) References Cited

U.S. PATENT DOCUMENTS

| 4,662,467 A | * | 5/1987 | Arai et al. ................... 180/210 |
| 5,845,918 A | * | 12/1998 | Grinde et al. ............ 280/124.1 |
| 5,855,250 A | * | 1/1999 | Nishi .......................... 180/312 |
| 6,186,550 B1 | * | 2/2001 | Horii et al. ................... 280/833 |
| 6,702,058 B2 | * | 3/2004 | Ishii et al. .................... 180/311 |
| 7,306,069 B2 | * | 12/2007 | Takeshima et al. .......... 180/312 |
| 7,407,031 B2 | * | 8/2008 | Hayashi et al. ............. 180/311 |
| 2001/0027890 A1 | * | 10/2001 | Bria et al. .................... 180/291 |
| 2002/0117843 A1 | * | 8/2002 | Rasidescu et al. ........... 280/781 |
| 2004/0195035 A1 | * | 10/2004 | Takeshima et al. .......... 180/312 |

FOREIGN PATENT DOCUMENTS

JP  6-92233  11/1994

* cited by examiner

*Primary Examiner*—Paul N Dickson
*Assistant Examiner*—Timothy D Wilhelm
(74) *Attorney, Agent, or Firm*—Wenderoth, Lind & Ponack, L.L.P.

(57) ABSTRACT

An object of the invention is to provide a body frame structure for a straddle-type four wheeled vehicle having a light weight and a high rigidity. The body frame structure included, a pair of right and left upper frame members, a pair of right and left lower frame members; a front frame member; and a pair of right and left bracket members connecting rear ends of the upper frame members and rear ends of the lower frame members. The upper frame members, the lower frame members, the front frame member and the bracket members are made of aluminum or alloy including aluminum.

15 Claims, 10 Drawing Sheets

BODY FRAME STRUCTURE OF STRADDLE-TYPE FOUR WHEELED VEHICLE

BACKGROUND OF THE INVENTION

1. Field of the Invention

The present invention relates to a body frame structure of a straddle-type four wheeled vehicle which is suitable for rough ground travel.

2. Description of the Related Art

The body frame of the straddle-type four wheeled vehicle has been conventionally structured by steel frame members such as a steel pipe or the like, as described in Japanese examined publication, H06-92233, and has been generally structured such that the steel pipes are connected to each other by welding or the like.

As in the conventional example mentioned above, the body frame structured by the steel frame members can sufficiently maintain strength only by welding the steel pipes, and does not require a lot of reinforcing parts. However, this design causes an increase in the weight of a vehicle body and an increase of the material cost.

With respect to the steel body frame mentioned above, in order to reduce weight of the steel body frame, the body frame (an aluminum frame) is made of aluminum or alloy including aluminum. However, it is impossible to sufficiently secure the strength by the structure in which the frame members of the aluminum pipes or the like are simply directly connected to each other by welding. Namely, the strength of the structure consisting of the welded aluminum pipes or the like is less than the strength of the structure consisting of the welded steel pipes or the like. Accordingly, it is necessary to add a lot of reinforcing members to the respective connected portions, the various parts support portions, and the various parts mounting portions, resulting in a lot of trouble during manufacturing and assembling.

SUMMARY OF THE INVENTION

The present invention is made by taking the problems mentioned above into consideration. An object of the present invention is to provide a body frame structure of a straddle-type four wheeled vehicle which is light and is easily manufactured and assembled.

In order to achieve the object mentioned above, in accordance with the present invention, there is provided a body frame structure of a straddle-type four wheeled vehicle comprising: a pair of right and left upper frame members; a pair of right and left lower frame members; a front frame member connecting a front end of the upper frame member and a front end of the lower frame member; and a pair of right and left bracket members connecting rear the upper frame members and rear ends of the lower frame members. The upper frame members, the lower frame members, the front frame member and the bracket members are made of aluminum or alloy including aluminum.

The above bracket members may be constituted by a molded member.

In accordance with the structure mentioned above, the weight of the body frame can be reduced in comparison with the conventional steel body frame. Further, since the bracket member is constituted by the molded member, it is possible to integrally and simply form various connecting portions, parts support portions, and parts mounting portions with the bracket member while maintaining the weight saving, and it becomes easy to manufacture and assemble the structure. In this case, the molded member means a member manufactured by casting, forging or die casting, and the term "molded member" as used below has the same meaning.

It is preferable that the bracket member have a swing arm support portion for rear wheels of the vehicle.

In accordance with the structure mentioned above, the swing arm support portion can be simply formed by molding on the basis of the casting, the forging or the die casting.

It is preferable that the bracket member have a connecting portion at an upper end thereof, and the upper frame member also have a connecting portion at a rear end thereof. The former of the connecting portions may open so that the latter of the connecting portions is inserted therein, and an edge of the former may be shaped on the bias to a surface perpendicular to an inserting direction of the latter.

In accordance with the structure mentioned above, it is possible to easily arrange the upper frame member in a predetermined relative position to the bracket member and keep them in the predetermined position upon assembling. Moreover, it is possible to secure a long welding length (beam length) along the bias opening edge in the case of connecting by welding, and it is possible to improve the strength of the connecting portion.

It is preferable that the bracket member has a connecting portion at a lower end thereof, and the lower frame member may also have a connecting portion at a rear end thereof. The former of the connecting portions opens so that the latter of the connecting portions is inserted therein, and an edge of the former is shaped on the bias to a surface perpendicular to an inserting direction of the latter.

In accordance with the structure mentioned above, it is possible to easily arrange the lower frame member in a predetermined relative position to the bracket member and keep them in the predetermined position upon assembling. Moreover, it is possible to secure a long welding length (beam length) along the bias opening end edge in the case of connecting by welding, and it is possible to improve the strength of the connecting portion.

It is preferable that the bracket member may have a plurality of mounting portions mounting a rear frame member for a seat of the vehicle thereto.

In accordance with the structure mentioned above, it is possible to easily form the mounting portions with the bracket member upon molding.

It is preferable that the body frame structure have one or more cross members made of aluminum or alloy including aluminum, and the cross member may connect the right and left bracket members to each other.

In accordance with the structure mentioned above, it is possible to improve a rigidity of the right and left molded bracket members.

It is preferable that the cross member may have a support portion supporting a rear shock absorber for supporting the swing arm to the body frame structure.

In accordance with the structure mentioned above, it is possible to support the rear shock absorber, to which a great load and impact are applied, by the cross members, and the cross member serves as a reinforcing member.

It is preferable that each of the bracket members may have integrally connected to the cross member. The boss may protrude toward a center of a vehicle width, and may have an outer peripheral surface which is formed in a curved shape so as to be smoothly connected to a surface of the bracket member.

In accordance with the structure mentioned above, since the surface of the boss and the surface of the bracket member are smoothly connected by the curved surface, it is possible to maintain a high strength between the boss and the bracket member without forming any new reinforcing member, and it is possible to avoid a stress concentration.

It is preferable that the right and left lower frame members may be arranged so as to open in a rearward V shape, so as to close to each other at the front ends thereof. A rear end of the front frame member and the front end of each of the lower frame members are connected via a joining member made of aluminum or alloy including aluminum.

In accordance with the structure mentioned above, since the joining member is used, it is easy to execute the connecting work between the front frame member and the lower frame members in comparison with the structure in which the members such as the pipes are directly connected, and it is possible to maintain a higher strength of the connecting portion.

It is preferable that the joining member be constituted by a molded member.

In accordance with the structure mentioned above, it is possible to integrally form the connecting portions in the joining member easily, and it is easy to execute the manufacturing and assembling work.

It is preferable that a joining bracket connecting the upper frame members to the front frame member may be fixed to the front end of the front member. The joining bracket may be made of aluminum or alloy including aluminum and may have a pair of fitting holes in which the front ends of the right and left upper frame members are respectively inserted.

In accordance with the structure mentioned above, since the joining bracket is used, it is easy to execute the connecting work between the upper frame members and the front frame member in comparison with the structure in which the members such as the pipes or the like are directly connected, and it is possible to maintain the high strength of the joint portion.

It is preferable that the front frame member may be arranged at a center position of the vehicle width, and may have support portions supporting right and left lower suspension arms suspending front wheels of the vehicle, and the support portions may be arranged at both right and left sides of the front frame member.

In accordance with the structure mentioned above, it is possible to make the right and left lower suspension arms long without widening the interval between the right and left wheels, a radius of vertical oscillation of the wheel becomes long, and it is possible to achieve a high suspension function.

It is preferable that the body frame structure have a pair of right and left center frame members extending rearward from front end portions of the upper frame member approximately in a longitudinal direction of the vehicle and made of aluminum or alloy including aluminum, and the frame members may be provided at a center position of a vehicle width of the body frame. A suspension arm support bracket supporting the right and left upper suspension arms suspending the front wheels with the right and left lower suspension arm may be bridged over the right and left center frame members.

In accordance with the structure mentioned above, since the right and left upper suspension arms are supported by the support bracket commonly used for the right and the left, it is possible to reduce the number of parts for supporting the suspension arms. Further, since the support bracket is bridged over the right and left center frame members, the support bracket serves as a function of the cross member connecting the right and left center frame members, and it is possible to increase a rigidity of the body frame itself.

It is preferable that a steering shaft support bracket supporting a steering shaft arranged at a front portion of the vehicle be bridged over the right and left upper frame members. The steering shaft support bracket may be made of aluminum or alloy including aluminum. A steering shaft may be arranged at a front portion of the body frame, and a steering shaft support bracket made of aluminum or alloy including aluminum may be bridged over the right and left upper frame members.

In accordance with the structure mentioned above, it is easy to manufacture the steering shaft support bracket, and, it is possible to improve a rigidity of the right and left upper frame members on the basis of the steering shaft support bracket.

It is preferable that the lower frame member have a cross sectional shape in which a dimension in a vertical direction is larger than a dimension in a lateral direction.

In accordance with the structure mentioned above, since the cross sectional shape of the lower frame member to which the great load is applied from the upper side is formed in the shape which is longer in the vertical direction than the width direction, it is possible to maintain a high rigidity while maintaining the weight savings.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Outline of Vehicle

Figure 1:
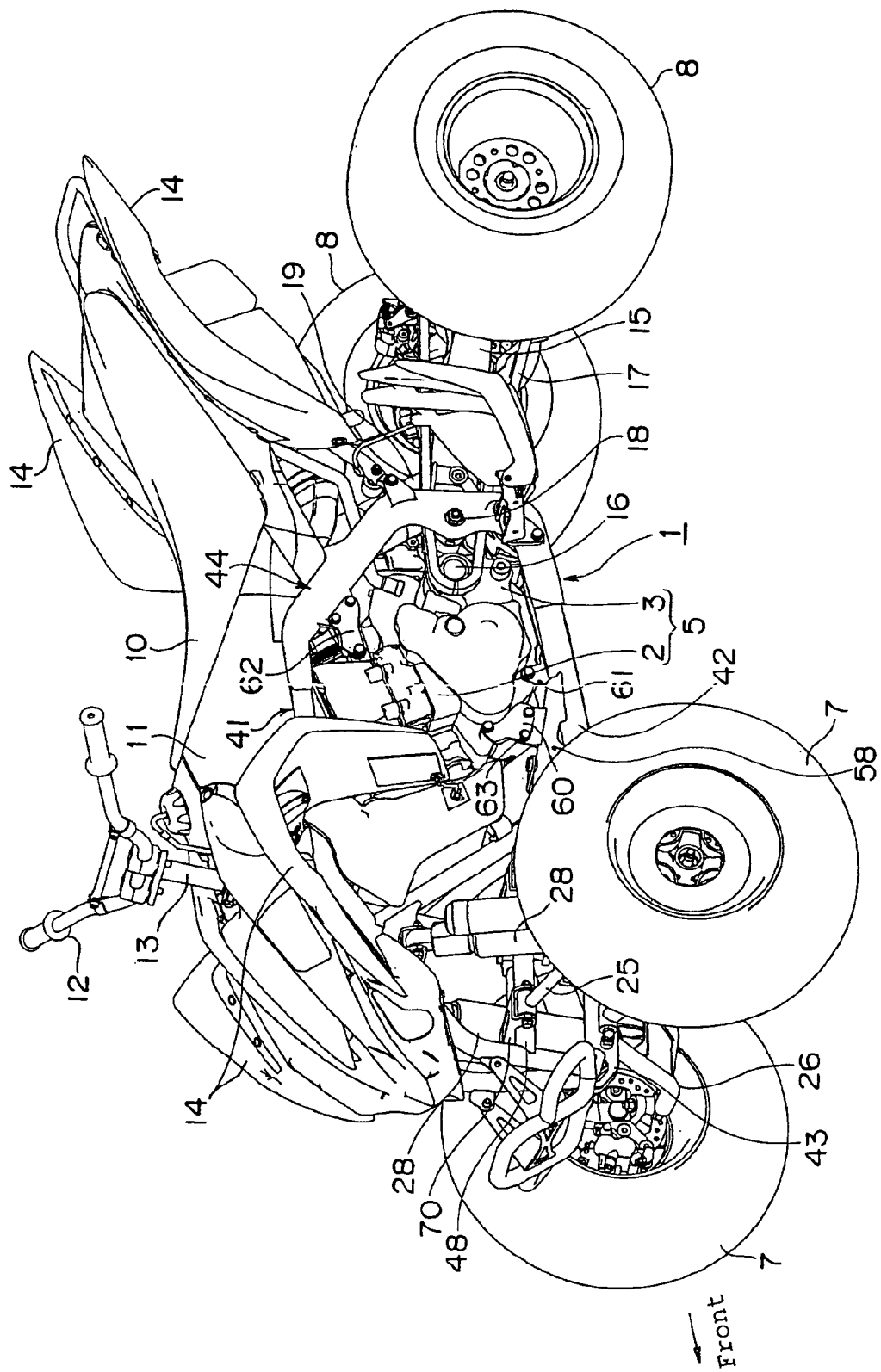
FIG. 1 is a perspective view showing an embodiment of a straddle-type four wheeled vehicle for rough ground provided with a body frame structure in accordance with the present invention.

FIGS. 1 to 14 show an embodiment of a straddle-type four wheeled vehicle of a sport type for rough ground in accordance with the present invention. In FIG. 1 showing a perspective view of the four wheeled vehicle, a power unit 5 of the vehicle comprises an engine 2, a transmission including a transmission case 3, and the like. The power unit 5 is arranged within a body frame 1, and is supported to the body frame 1 via a plurality of engine brackets 60, 61 and 62. A front portion of the body frame 1 is provided with a pair of right and left front wheels 7, a rear side of the body frame 1 is provided with a pair of right and left rear wheels 8, an upper side of the body frame 1 is provided with a straddle-type seat 10, a fuel tank 11, a steering handle 12 and the like. An upper side of the front wheels 7 and the rear wheels 8 is provided with a fender 14 and the like, respectively. The steering handle 12 is fixed to an upper end of a steering shaft 13 extending downwardly.

The rear wheels 8 are supported by a rear end of a swing arm 15. A front end of the swing arm 15 is supported by a swing arm support portion 18 of the body frame 1 so as to freely swing up and down. A lower end of a rear shock absorber 19 is connected to a middle portion of the swing arm 15 via a link mechanism (not shown). Rotational power of the engine 2 is transmitted to an output sprocket 16 of the transmission via a transmission mechanism within the transmission case 3, and is transmitted to the rear wheels 8 from the output sprocket 16 via a drive chain 17.

Figure 2:
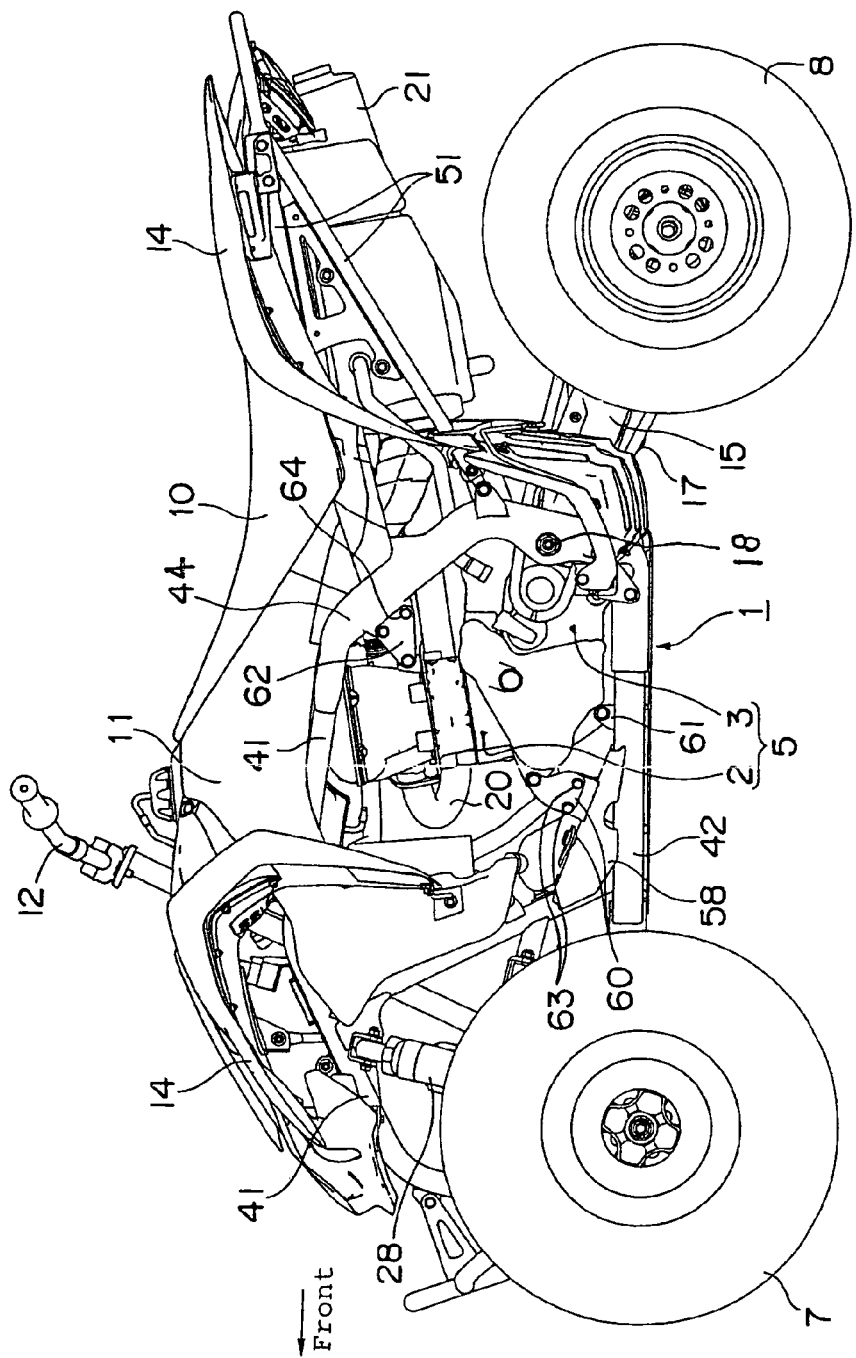
FIG. 2 is a left side view of the four wheeled vehicle in FIG. 1.

FIG. 2 is a left side view of the four wheeled vehicle. An exhaust pipe 20 connected to an exhaust port of the engine 2 extends rearward, and is connected to an exhaust muffler 21 arranged behind the body frame 1.

Figure 3:
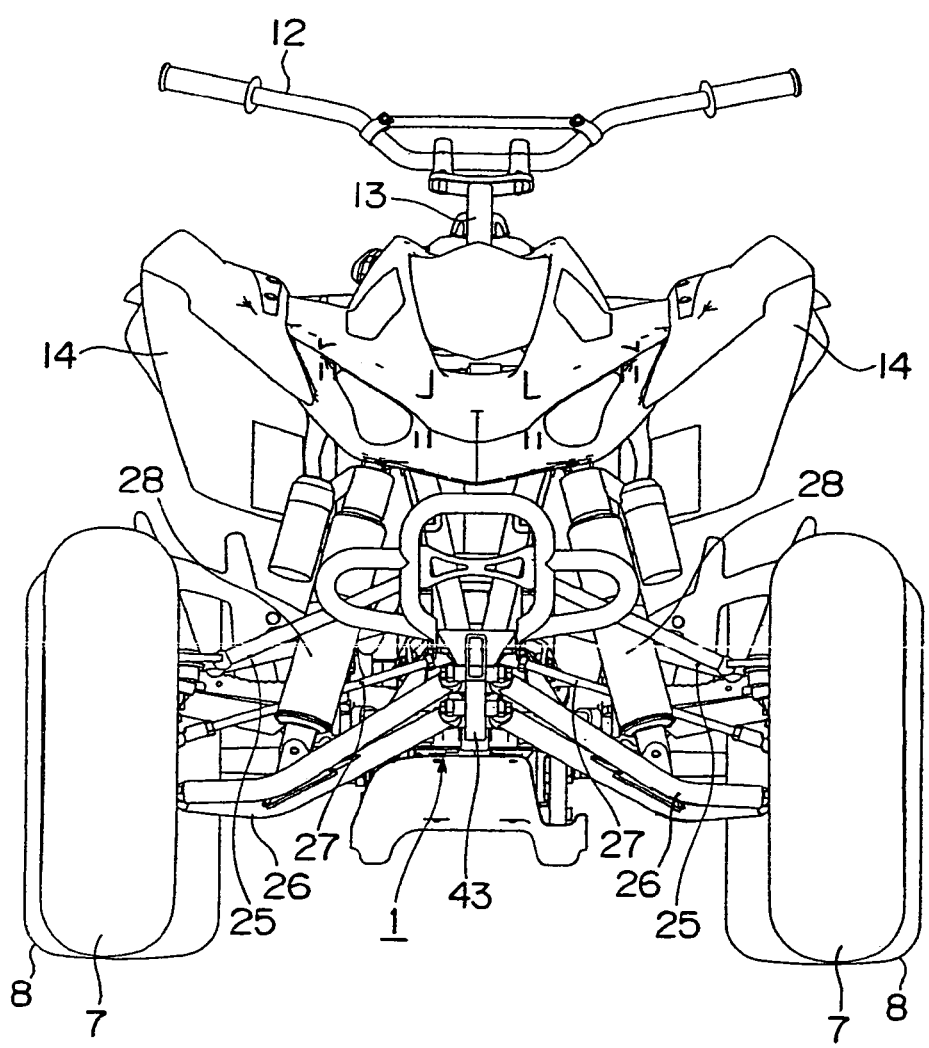
FIG. 3 is a front view of the four wheeled vehicle in FIG. 1.

FIG. 3 is a front view of the four wheeled vehicle. The right and left front wheels 7 are suspended to the body frame 1 by a double wishbone type suspension so as to be independent right and left. In other words, the right and left front wheels 7 are respectively supported to the body frame 1 by a pair of upper and lower A-shaped (or V-shaped) suspension arms 25 and 26 so as to freely swing up and down. Lower ends of front shock absorbers 28 are connected to the middle portions of the right and left lower suspension arms 26. Further, the right and left front wheels 7 are connected to the steering shaft 13 in an interlocking manner via a tie rod so as to be freely steered right and left.

[Entire Structure of Body Frame]

Figure 4:
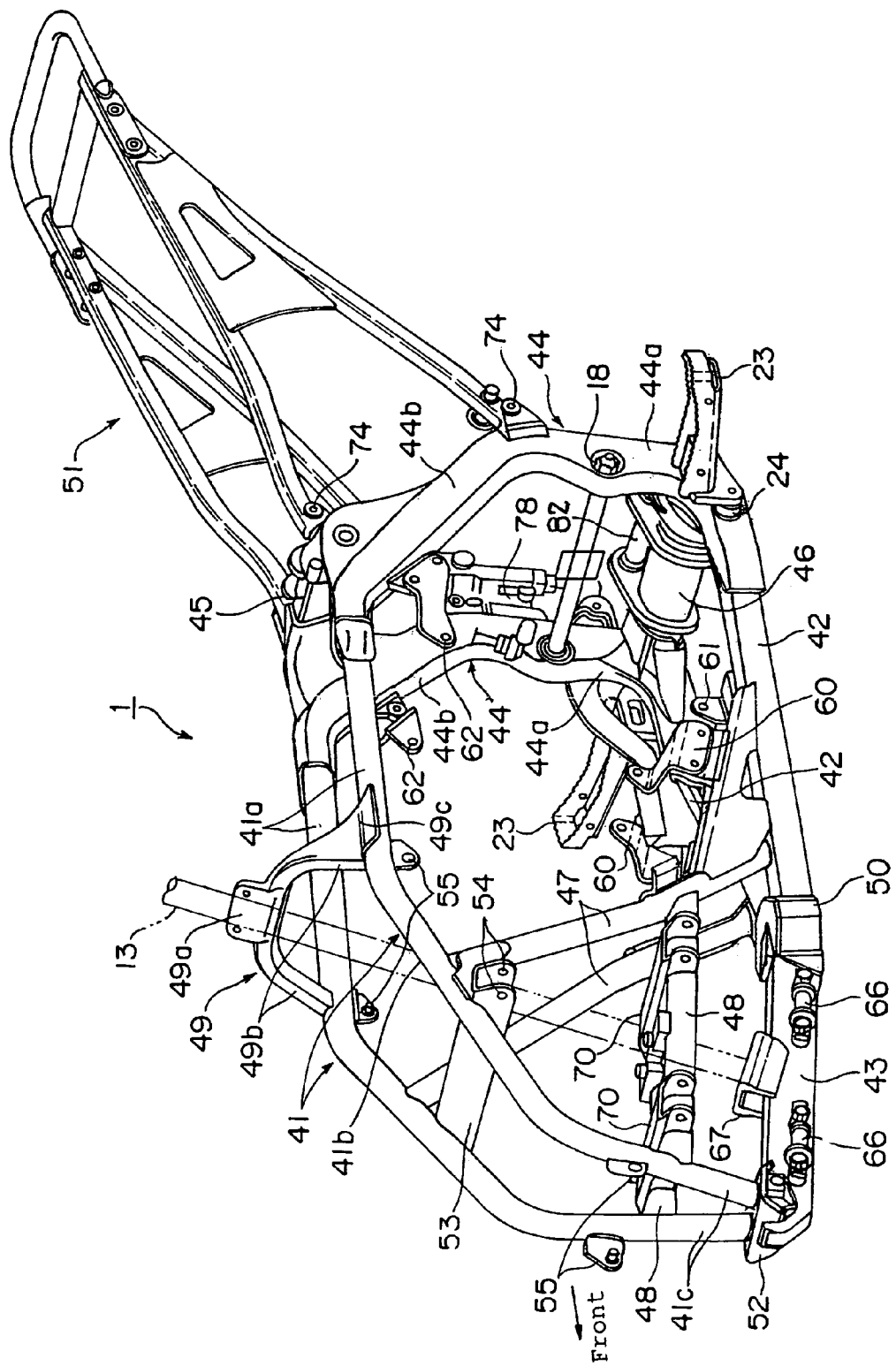
FIG. 4 is a perspective view of a body frame of the four wheeled vehicle in FIG. 1.

FIG. 4 is an entire perspective view of the body frame 1. The body frame 1 is integrally provided with a pair of right and left upper frame members 41, a pair of right and left lower frame members 42, a single front frame member 43 connecting front ends of the lower frame members 42 and front ends (front lower ends) of the upper frame members 41, a pair of right and left bracket members 44 connecting rear ends of the upper frame members 41 and rear ends of the lower frame members 42, upper and lower cross members 45 and 46 respectively connecting upper ends of right and left bracket members 44 to each other and lower ends thereof to each other, a pair of right and left intermediate stay members 47 rising forward and upward from front middle portions of the lower frame members 42 and reaching intermediate portions 41b of the upper frame members 41, a pair of right and left center frame members 48 extending forwardly from lower portions of the intermediate stay members 47 and reaching front end portions 41c of the upper frame members 41, a steering shaft support bracket 49 bridged over the right and left upper frame members 41, and a joining member 50 connecting a rear end of the front frame member 43 and front ends of the lower frame members 42. A rear frame member 51 extending to a rear side for mounting the seat 10 (FIG. 1) thereon is detachably mounted to an upper half portion 44b of the bracket members 44 by bolts or the like.

All of the members 41, 42, 43, 44, 45, 46, 47, 48, 49 and 50 mentioned above constituting the body frame 1 and the rear frame member 51 are made of aluminum or alloy including aluminum. Among them, the upper frame members 41, the lower frame members 42, the front frame member 43, the intermediate stay members 47 and the center frame members 48 are formed in a pipe shape by extrusion molding. In other words, they are constituted by extrusion molded members in pipe shape. On the other hand, the bracket members 44, the steering shaft support bracket 49 and the joining member 50 are formed in a hollow shape by casting. In other words, they are constituted by cast molded members in hollow shape. The alloy including the aluminum used as the material for each of the members can employ alloy, for example, including zinc, magnesium, silicon or the like in addition to the aluminum. In this case, "the aluminum or the alloy including the aluminum" is simply called "the aluminum alloy or the like" hereinafter.

[Structure of Each Member of Body Frame]

(Upper Frame Member)

In FIG. 4, the upper frame members 41 which are the extrusion molded members are each formed in a pipe shape having a circular cross sectional shape so as to be easily bent. Rear half portions 41a of the upper frame members 41 extend approximately horizontally and in a longitudinal direction in parallel to each other. Intermediate portions 41b of the upper frame members 41 are bent in a forward and downward direction from front ends of the rear half portions 41a, and are structured such that a lateral interval thereof becomes narrower toward the forward downward side. The front end portions 41c of the upper frame members 41 are bent approximately downward from the front ends of the intermediate portions 41b, and are connected to a front end of the front frame member 43 via a joining bracket 52 for connecting.

The steering shaft support bracket 49 of the cast molded member is bridged over the front ends of the rear half portions 41a of the upper frame members 41. The steering shaft support bracket 49 integrally has a planar shaft support portion 49a supporting a middle portion of the steering shaft 13, a gate-shaped or arch-shaped leg portion 49b expanding to the right and the left from the shaft support portion 49a, and triangular reinforcing members 49c formed in both ends of the leg portion 49b. Right and left lower ends of the leg portion 49b and the reinforcing portions 49c are connected to the upper frame members 41 by welding.

Figure 5:
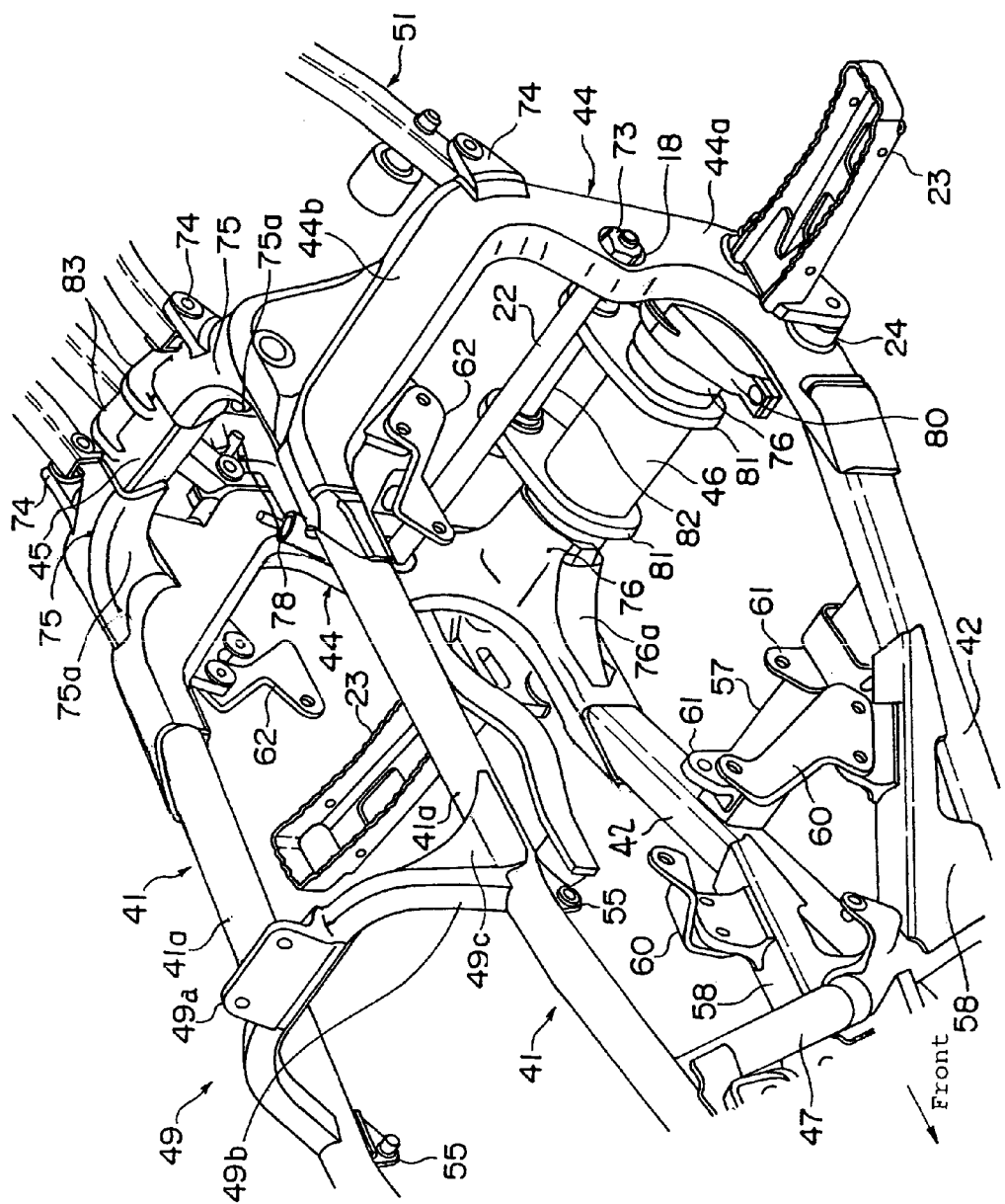
FIG. 5 is an enlarged perspective view of a rear portion of the body frame of the four wheeled vehicle in FIG. 1.
Figure 7:
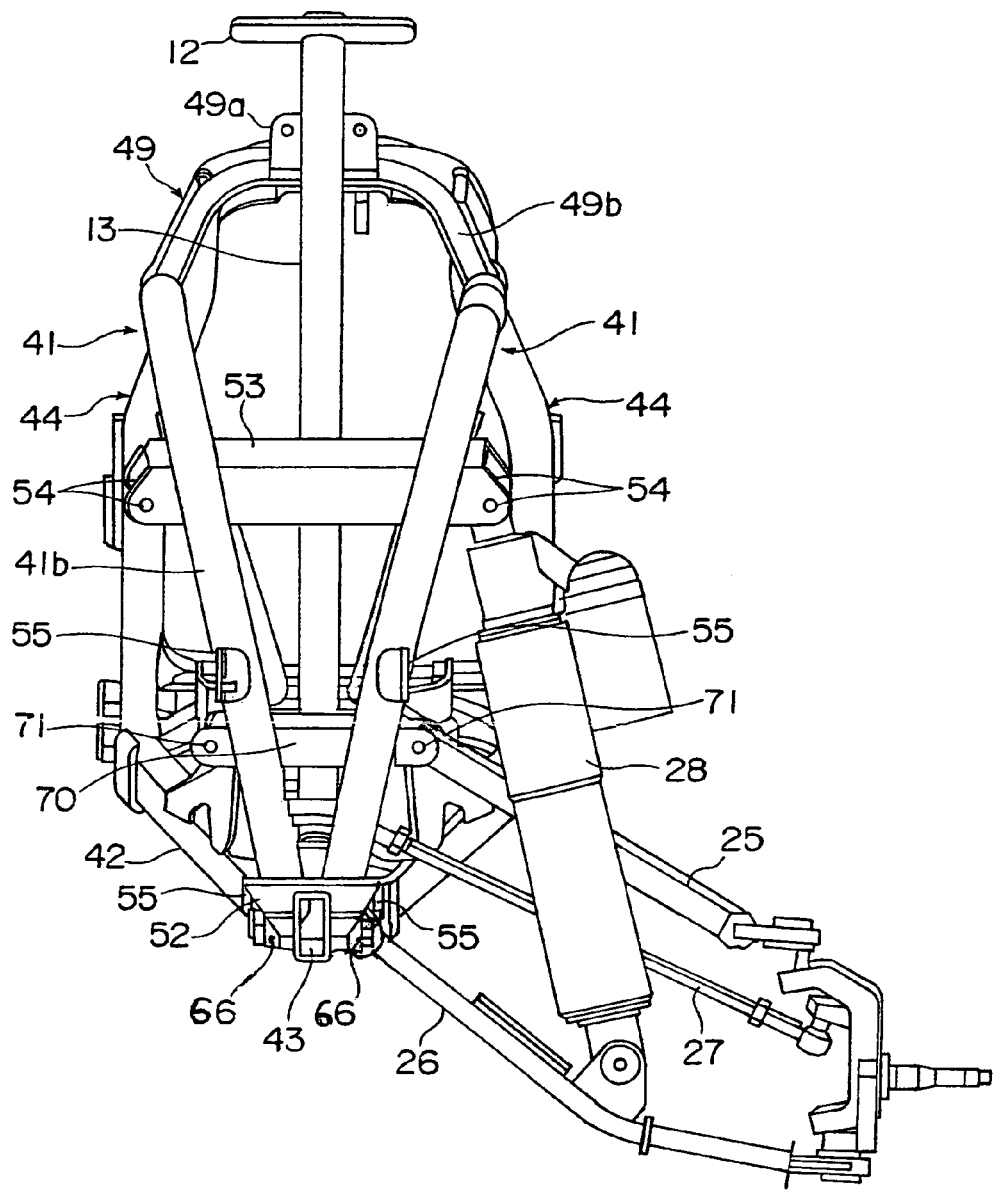
FIG. 7 is a front view of the body frame of the four wheeled vehicle in FIG. 1.

A support member 53 supporting upper ends of the front shock absorbers 28 is fixed to the intermediate portions 41b of the upper frame members 41, as shown in FIG. 7. The support member 53 is constituted by an extrusion molded member having a C-shaped cross sectional shape and is made of aluminum alloy or the like. Both right end left ends of the support member 53 are fixed (joined) to the upper frame members 41 by welding, and support holes 54 supporting the front shock absorbers are formed in both right and left ends of the support member 53. Further, a plurality of brackets 55 attaching covers and fenders are fixed (joined) to the front surfaces of the front end portions 41c of the upper frame members 41 and the right and left end of the joining bracket 52 by welding. Moreover, as shown in FIG. 5, the brackets 55 attaching the covers are also fixed (joined) to the rear half portions 41a of the upper frame members 41 by welding.

(Lower Frame Member)

In FIG. 4, the lower frame members 42 of the extrusion molded member are formed in a rectangular pipe shape having a cross sectional shape in which a dimension in a vertical direction is longer than a dimension in a width (lateral) direction, are arranged approximately horizontally, and are arranged so as to open in a V shape rearward in a plan view. As shown in FIG. 5, intermediate portions in a longitudinal direction of the lower frame members 42 are connected to each other by a pipe-shaped cross member 57 having a rectangular cross sectional shape. Both ends of the cross member 57 are respectively connected to the lower frame members 42 by welding. The cross member 57 is made of the aluminum alloy or the like, and is constituted by an extrusion molded member.

A reinforcing member 58 formed in a triangular shape in a side view is fixed by welding to each of the lower frame members 42 and the intermediate stay member 47. The reinforcing member 58 extends from a rear surface of the lower half portion of the intermediate stay member 47 to an upper surface of the lower frame member 42. The engine bracket 60 is fixed to an engine mount bracket formed on an upper slope surface of each of the reinforcing members 58 by bolts 63 (refer to FIG. 2). Further, the other engine brackets 61 are fixed to an upper surface of the cross member 57 by bolts (not shown).

Since the cross sectional shape of each lower frame member 42 is rectangular and is longer in the vertical direction, as in the structure mentioned above, it is possible to maintain a high rigidity with respect to a load applied from the upper side, and it is possible to improve the strength of the body frame 1.

(Front Frame Member)

Figure 6:
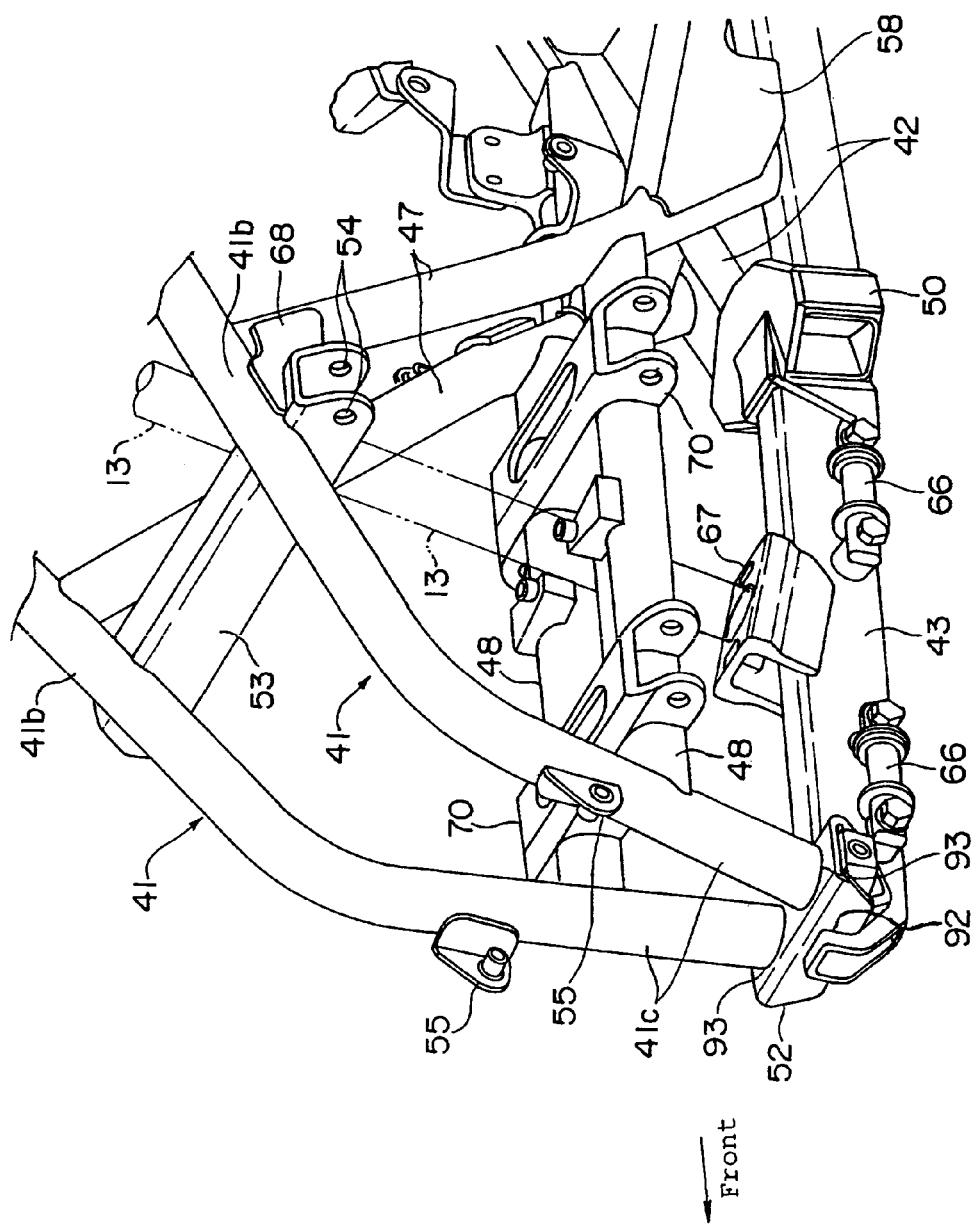
FIG. 6 is an enlarged perspective view of a front portion of the body frame of the four wheeled vehicle in FIG. 1.

In FIG. 6, the front frame member 43 is formed in a rectangular pipe shape having a cross sectional shape in which a dimension in the vertical direction is longer than a dimension in a width (lateral) direction. Only one front frame member 43 is arranged in an approximately center position of the vehicle width so as to extend in a longitudinal direction of the vehicle, and is inclined slightly in a forward upward direction. A shaft support portion 67 supporting a lower end of the steering shaft 13 and having a C-shaped cross sectional shape is fixed (joined) to an upper surface of the front frame member 43 by welding. Two pairs of support pins 66 supporting the lower suspension arms 26 (refer FIG. 7) are provided at right and left side surfaces of the front frame member 43 (only left side support pins 66 are shown in FIG. 6). The right side support pins 66 are spaced rearward and forward to each other, and the left side support pins 66 are also spaced rearward and forward to each other. Base ends of the right and left lower suspension arms 26 are respectively supported by the support pins 66 so as to freely swing in a vertical direction, as shown in FIG. 7.

As in the structure mentioned above, since only one front frame member 43 is arranged in the center position of the vehicle width, and the right and left lower suspension arms 26 are supported by the right and left side surfaces of only the front frame member 43 via the support pins 66, it is possible to elongate the lower suspension arm 26 without widening the interval between the right and left front wheels 7, whereby a swinging radius of the lower suspension arm 26 becomes long, and it is possible to improve a suspension function. Further, since the cross sectional shape of the front frame member 43 is rectangular and is longer in the vertical direction, in the same manner as the lower frame member 42, it is possible to maintain a high rigidity with respect to the load applied from the upper side, and it is possible to improve a strength of the body frame 1.

(Intermediate Stay Member)

In FIG. 6, a reinforcing member 68 is fixed to an upper end of each of the intermediate stay members 47 by welding, and the upper end of the intermediate stay member 47 is connected to each of the upper frame members 41 together with the reinforcing member 68 by welding. A lower end of the intermediate stay member 47 is fixed to each of the lower frame member 42 together with the support table 58 by welding.

(Center Frame Member)

Figure 14:
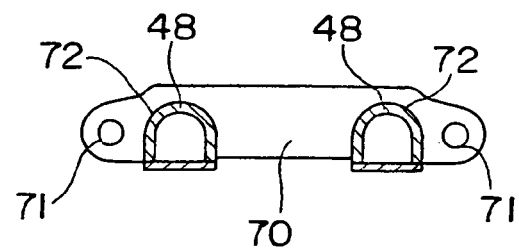
FIG. 14 is a vertical cross sectional front view of center frame members of the four wheeled vehicle in FIG. 1.

In FIG. 6, the right and left center frame members 48 are inclined slightly in a forward upward direction so as to be parallel to the front frame member 43. The front end and rear end of the center frame member 48 are respectively connected to the front end portions 41c of the upper frame members 41 and the intermediate stay member 47 by welding. FIG. 14 is a vertical cross sectional front view of the center frame member 48. A cross section of the center frame member 48 is formed in a pipe shape in which an upper half portion is a semicircular shape and a lower half portion is a rectangular. As shown FIGS. 6 and 14, a pair of front and rear suspension arm support brackets 70 supporting the upper suspension arms are bridged over both the center frame members 48. The suspension arm support bracket 70 has a pair of right and left notches 72 corresponding to the cross sectional shape of the center frame member 48. The notches 72 of the suspension arm support bracket 70 are fitted to the right and left center frames 48 from above, and are welded to the center members 48. The suspension arm support bracket 70 has a pair of pin support holes 71 at both ends thereof. As shown in FIG. 7, a base end of each of the upper suspension arms 25 is supported to the pin support hole 71 so as to freely swing in the vertical direction.

In FIG. 6, since the suspension arm support bracket 70 supporting the upper suspension arms is bridged over the right and left center frame members 48, the suspension arm support bracket 70 serves as a cross member, and it is possible to improve a rigidity of the right and left center frame members 48. Further, since the suspension arm support bracket 70 is commonly used for the right and left side suspension arms, it is possible to reduce the number of the parts for supporting the upper suspension arm, and it is easy to execute the attaching work.

(Bracket Member)

In FIG. 5, the bracket member 44 of the hollow cast molded member is structured such that a lower half portion 44a is formed in an L shape in a side view and an upper half portion 44b is inclined forward. The swing arm support portion 18 supporting a swing arm shaft 22 is formed in an intermediate portion of the lower half portion 44a, and the swing arm shaft 22 is inserted into a support hole formed in the swing arm support portion 18 and is fixed to the bracket member 44 by a nut 73 or the like.

A mounting portion 24 mounting a step 23 for supporting a foot of the rider is formed in an outer peripheral surface of a lower end of each of the right and left bracket members 44. A lower boss 76 to be fixed to the lower cross member 46 is integrally formed in an inner side surface (a side surface in a center side of the vehicle width) of the lower end of each of the bracket members 44. Further, an upper boss 75 to be fixed to the upper cross member 45 is integrally formed in a rear surface of the upper end of each of the bracket members 44. The upper boss 75 protrudes toward a center of the vehicle width an approximately L shape in a plan view. An outer peripheral surface, particularly a front outer peripheral surface 75a of the upper boss 75 is formed in a curved shape having a large radius of curvature, and is smoothly connected to the surface of the bracket member 44. A plurality of mounting brackets (a mounting portion) 74 attaching the rear frame member 51 to the body frame 1 are integrally formed in a rear surface of each of the upper boss 75 and a rear surface of a center position in the vertical direction of each of the bracket members 44. Further, the engine bracket 62 is fixed to a front surface of the upper half portion 44b of each of the bracket members 44 by a bolt 64 (FIG. 1), and a reserve tank mounting bracket 78 for a brake is integrally formed in a rear surface of the lower half portion 44a of the right bracket member 44.

Figure 13:
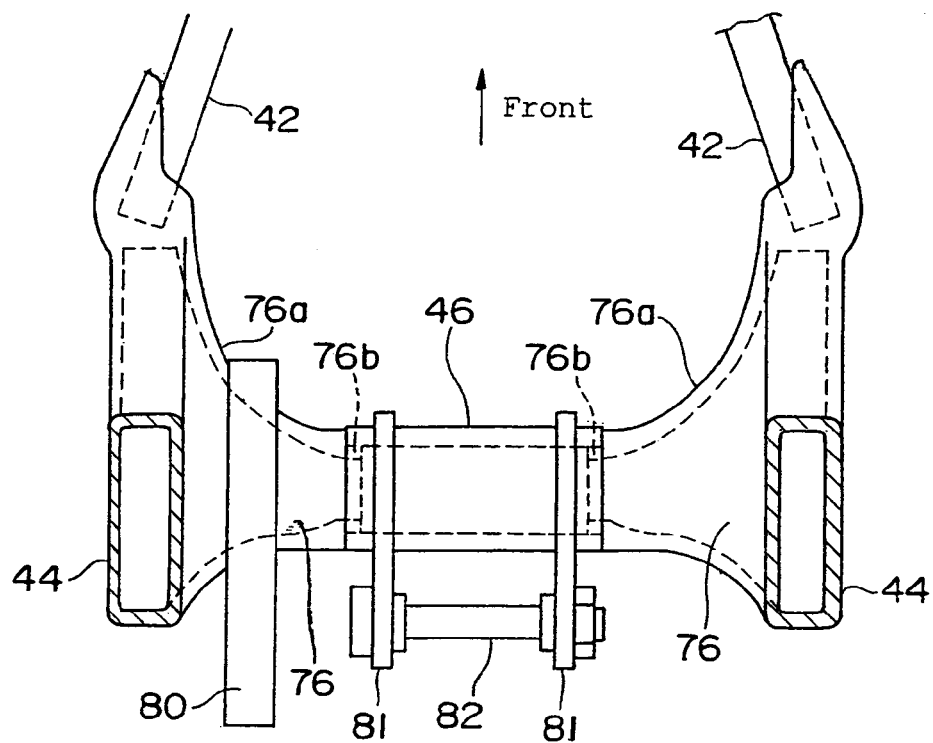
FIG. 13 is a horizontal cross sectional enlarged view of the bracket members of the four wheeled vehicle in FIG. 1.

FIG. 13 is a horizontal cross sectional view of the bracket members 44. The lower boss 76 protrudes toward the center of the vehicle width, and is formed in a mountain shape in which a hem base is greatly widened. In particular, a front outer peripheral surface 76a is formed in a curved surface having a large radius of curvature, and is smoothly connected to the surface of the bracket member 44. Further, a chain guide member 80 is fixed to the left lower bosses 76.

As in the structure mentioned above, since the curved surfaces 75a and 76a having the large radius of curvature are formed in the outer peripheral surfaces of the upper and lower bosses 75 and 76, and the surface of the bracket member 44 is smoothly connected to the upper and lower bosses 75 and 76 via the curved surfaces 75a and 76a, it is possible to maintain a high strength of the upper and lower bosses 75 and 76 without forming any new reinforcing member, and it is possible to avoid a stress concentration. Further, since the bracket member 44 is constituted by the cast molded member, it is possible to integrally form the upper bosses 75 and 76 easily.

(Cross Member)

In FIG. 13, a pair of right and left pin support plates (rear shock absorber support portion) 81 protruding rearward are integrally formed in the lower cross member 46, and the pin support plates 81 are provided with a pin 82. The pin 82 rotatably supports a link mechanism connected to the lower end of the rear shock absorber 19 (FIG. 1). Further, as shown in FIG. 5, a pair of right and left pin support plates (rear shock absorber support portions) 83 are integrally formed in the upper cross member 45, and the support plates 83 are provided with a pin (not shown) rotatably supporting an upper end of the rear shock absorber 19 (FIG. 1).

As in the structure mentioned above, since a pair of right and left bracket members 44 of the cast molded members made of the aluminum alloy or the like are connected to each other by the pipe-shaped cross member, particularly by the cross members 45 and 46 of the extrusion molded member, it is possible to maintain a high rigidity of the bracket member 44.

[Connecting Structure Between Respective Members of Body Frame]

All connecting portions between the above-described members constituting the body frame 1 are executed by welding. However, in order to improve the strength and the assembling property in the connecting portions, each of the connecting portions, fixing portions and parts support portions is structured as follows.

(Connecting Structure Between Bracket Member and Cross Member)

In FIG. 13, a small diameter portion 76b is formed in an end of each of the right and left lower bosses 76 via a step. Both the right and left ends of the lower cross member 46 are faucet fitted to the small diameter holes 76b and are brought into contact with edges of the bosses 76. An entire periphery of the edge of the boss 76 and an entire periphery of the edge of the lower cross member 46 is connected by welding.

As in the structure mentioned above, since the right and left bosses 76 are connected to each other via the lower cross member 46, the cross member 46 serves as a spacer during assembly, so that it is easy to determine a lateral interval of the bracket members 44 and a relative position between the bracket members 44 and the cross member 46, and it is easy to execute assembly.

In this case, the upper cross member 45 in FIG. 5 is fixed to the upper boss 75 by welding on the basis of the same connecting structure as the lower cross member 46.

(Connecting Structure Between Front Frame Member and Lower Frame Member)

Figure 8:
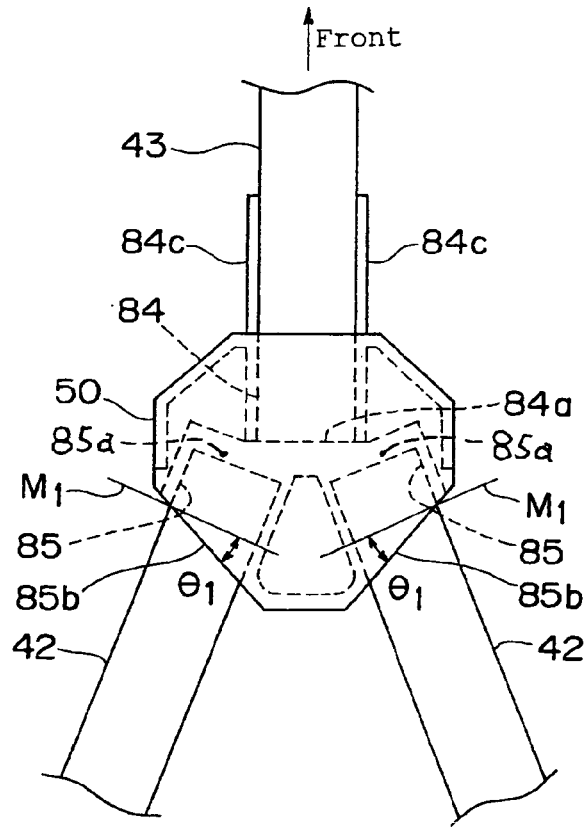
FIG. 8 is a plan enlarged view of a connecting portion between a front frame member and lower frame member of the four wheeled vehicle in FIG. 1.

FIG. 8 is an enlarged plan view of a portion connecting the rear end of the front frame member 43 and the front ends of the lower frame members 42 by the joining member 50 of the cast molded member. In the joining member 50, there are formed one front fitting concave portion 84 open forward and a pair of rear fitting concave portions 85 open rearward and slightly outward. The rear end of the front frame member 43 is inserted into the front fitting concave portion 84 from a rear side, and is brought into contact with a stopper wall 84a, and the front ends of the right and left lower frame members 42 are respectively inserted into the rear fitting concave portions 85, and are brought into contact with the stopper wall 85a provided in the joining member 50.

An open edge 85b of the rear fitting concave portion 85 is formed so as to be inclined at a fixed angle θ1 with respect to a surface M1 perpendicular to the inserting direction of the lower frame member 42 in a plan view, and an entire periphery of the open edge 85b is welded to the lower frame member 42.

Figure 9:
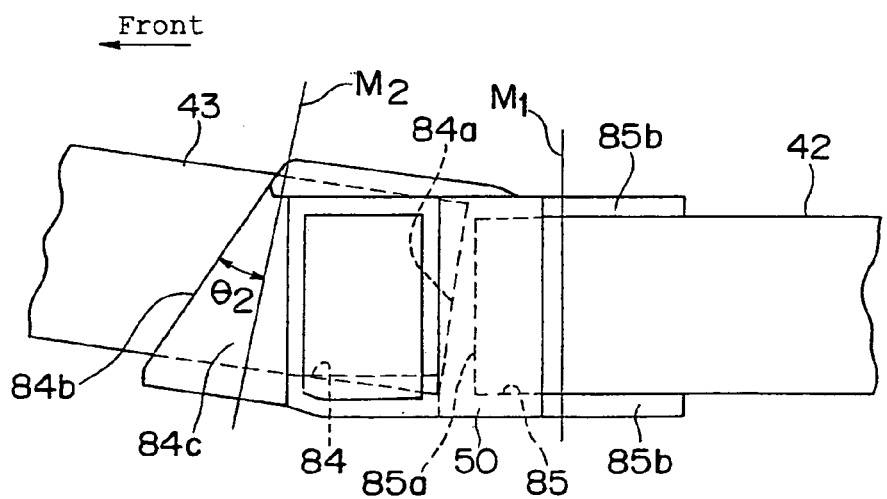
FIG. 9 is a left side view of FIG. 8.

In FIG. 9 which is a side view of FIG. 8, an extension portion 84c protruding forward is integrally formed in the front fitting concave portion 84, an open end edge 84b of the extension portion 84c is formed so as to be inclined at a fixed angle θ2 with respect to a surface M2 perpendicular to the inserting direction of the forward frame member 43 in a side view, and an entire periphery of the open edge 84b is welded to the front frame member 43.

As in the structure mentioned above, since the welded respective open edges 84b and 85b are formed on a bias with respect to the surfaces M1 and M2 perpendicular to the inserting directions, it is possible to secure a long welding length and it is possible to improve a strength of the connecting portion.

(Connecting Structure Between Front End of Upper Frame Member and Front End of Front Frame Member)

In FIG. 6, the joining bracket 52 having a notch 92 of a shape corresponding to the cross sectional shape of the upper half portion of the front frame 43 is fitted on the front end of the front frame 43 from the upper side, and a fitting portion of the notch 92 is welded to the front frame member 43. The joining bracket 52 is constituted by a rectangular pipe member made of the aluminum alloy or the like, and a pair of fitting holes 93 are formed in an upper end wall of the joining bracket 52 so that the upper frame members 41 can be inserted therein.

Figure 10:
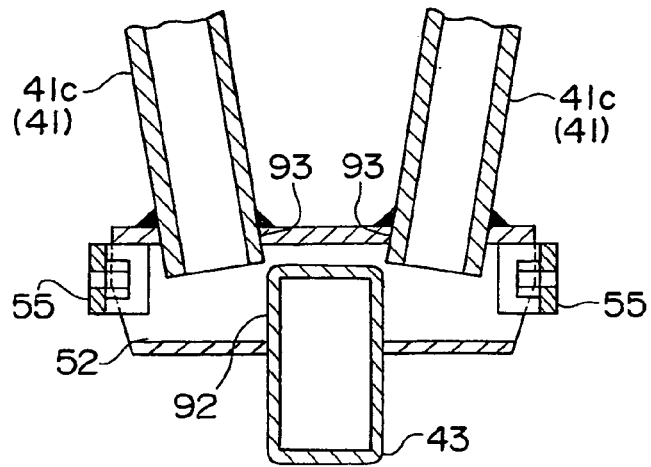
FIG. 10 is a vertical cross sectional front view of a connecting portion between a front end of the front frame member and front ends of upper frame members of the four wheeled vehicle in FIG. 1.

FIG. 10 is a vertical cross sectional front view of the joining bracket 52. In FIG. 10, the lower ends of the front end portions 41c of the upper frame members 41 are respectively fitted to the right and left fitting holes 93 from the upper side, and an entire periphery of the lower ends of the front end portions 41c are welded to the joining bracket 52.

As in the structure mentioned above, since the upper frame member 41 is fitted to the fitting hole 93 formed in the joining bracket 52, and is fixed to the joining bracket 52 by welding, it is possible to easily execute the welding work in comparison with the structure in which the front end of the upper frame member is cut on a bias and is directly welded to the right and left side surfaces of the lower frame member, such as in the conventional structure. Further, it is possible to easily adjust the relative position between the front frame member 43 and the upper frame member 41 during assembly.

(Connecting Structure Between Upper Frame Member and Bracket Member)

Figure 11:
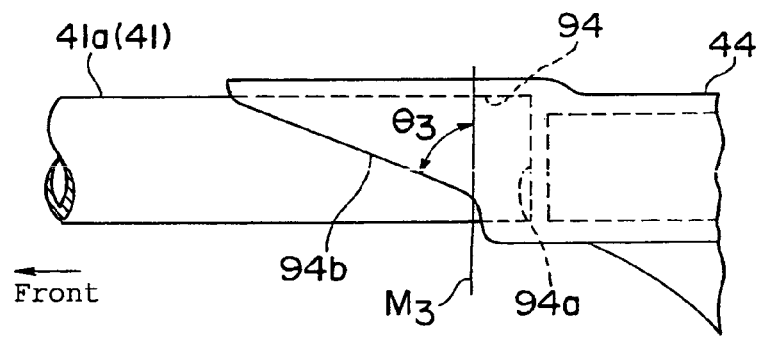
FIG. 11 is a plan enlarged view of a connecting portion between an upper end of a bracket member and a rear end of the upper frame member of the four wheeled vehicle in FIG. 1.

FIG. 11 is an enlarged plan view of a connecting portion between the upper end of the bracket member 44 and the rear end of the upper frame member 41. The rear end of the upper frame member 41 can be connected to the upper end of the bracket member 44 from the front side, as follows. A fitting concave section 94 (i.e., an open connecting portion) open forward is formed at the upper end of the bracket member 44, and an open edge 94b of the fitting concave section 94 is formed on a bias so as to have a fixed angle θ3 in a plan view, with respect to a surface M3 perpendicular to the inserting direction. A connecting portion at the rear end of the upper frame member 41 is inserted into the fitting concave section 94 from the front side, and is brought into contact with a stopper wall 94a within the fitting concave 94, thereby achieving positioning in the longitudinal direction. Further, an entire periphery of the open edge 94b is connected to the upper frame member 41 by welding.

As in the structure mentioned above, since the welded open edge 94b is formed on a bias with respect to the surface M3 perpendicular to the inserting direction, it is possible to secure a long welding length, and it is possible to improve a strength of the connecting portion.

(Connecting Structure Between Lower Frame Member and Bracket Member)

Figure 12:
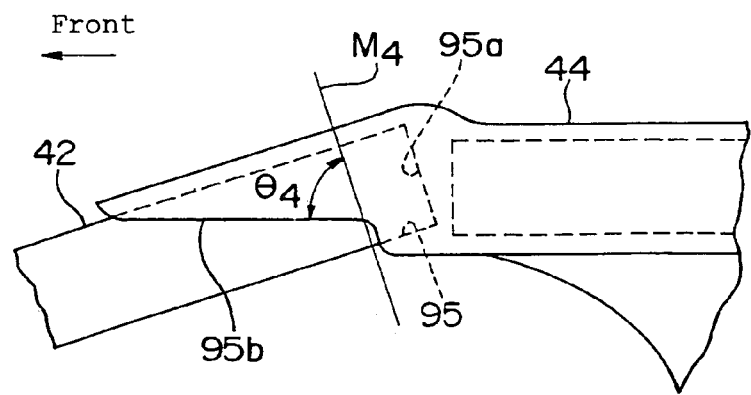
FIG. 12 is a plan enlarged view of a connecting portion between a lower end of the bracket member and a rear end of the lower frame member of the four wheeled vehicle in FIG. 1.

FIG. 12 is a plan enlarged view of a connecting portion between the lower end of the bracket member 44 and the rear end of the lower frame member 42. The lower frame member 42 can be connected to the lower end of the bracket member 44 from the front side as follows. A fitting concave section 95 open forward is formed at the lower end of the bracket member 44, and an open edge 95b of the fitting concave section 95 is formed on a bias so as to have a fixed angle θ4 in a plan view with respect to a surface M4 perpendicular to the inserting direction. The rear end of the lower frame member 42 is inserted into the fitting concave 95 from the front side, and is brought into contact with a stopper wall 95a within the fitting concave 95, thereby achieving a positioning in a longitudinal direction. Further, an entire periphery of the open edge 95b is connected to the lower frame member 42 by welding. In this case, since the lower frame member 42 is arranged so as to be open in a rearward V shape as mentioned above, the fitting concave section 95 is formed in an inclined shape so as to be slightly directed to the center of the vehicle width in a plan view.

As in the structure mentioned above, since the welded open edges 95b are formed on the bias with respect to the surface M4 perpendicular to the inserting direction, it is possible to secure a long welding length, and it is possible to improve a strength of the joint portion.

Other Embodiments (1) In the embodiment mentioned above, the bracket member 44, the joining member 50 and the steering shaft support bracket 49 are constituted by the cast molded member made of the aluminum or the alloy including aluminum. However, the present invention is not limited to the molded member by casting, and can be constituted by the other molded members. In other words, the present invention can be constituted by the molded member by aluminum die casting or forging, or the other molded members manufactured by using the other molds. In the case of these molded members, it is possible to obtain approximately the same effects as those of the embodiment mentioned above.

(2) The upper frame member, the lower frame member and the front frame member employ the pipe-shaped member in the embodiment mentioned above. However, it is possible to employ various molded members having a U-shaped cross section, a T-shaped cross section, an I-shaped cross section or the like.

(3) As for the front frame member, the above embodiment employs the single (one) member. However, the structure can be made, for example, such that the right and left two members are integrally joined so as to be arranged in the center of the vehicle width. Further, the front frame member is not limited to the rectangular cross section, and can be formed in an oval shape which is long in the vertical direction.

Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A body frame structure of a straddle-type four wheeled vehicle, comprising:
   a pair of right and left upper frame members, each of said upper frame members having a connecting portion at a rear end thereof;
   a pair of right and left lower frame members;
   a front frame member connecting a front end of said upper frame members to a front end of said lower frame members; and
   a pair of right and left bracket members connecting rear ends of said upper frame members and rear ends of said lower frame members, each of said bracket members having an open connecting portion at an upper end thereof, said connecting portion of each of said upper frame members being inserted into said open connecting portion of a respective one of said bracket members;
   wherein said upper frame members, said lower frame members, said front frame member and said bracket members are made of aluminum or an alloy including aluminum; and
   wherein an edge of said open connecting portion of each of said bracket members being shaped on a bias with respect to a plane perpendicular to an inserting direction of said connecting portion of each of said upper frame members, said edge being shaped such that an outside wall portion of said open connecting portion of each of said bracket members with respect to a width-wise direction of the vehicle extends further forward than an inside wall portion of said open connecting portion of said each of said bracket members in plan view.

2. The body frame structure of claim 1, wherein each of said bracket members has a swing arm support portion for supporting rear wheels of the vehicle.

3. The body frame structure of claim 1, wherein each of said bracket members comprises a molded bracket member.

4. The body frame structure of claim 3, wherein each of said bracket members has an open lower connecting portion at a lower end thereof, and each of said lower frame members has a connecting portion at a rear end thereof, said connecting portion of each of said lower frame members being inserted into said open lower connecting portion of a respective one of said bracket members, and an edge of said open lower connecting portion of each of said bracket members being shaped on a bias with respect to a plane perpendicular to an inserting direction of said connecting portion of each of said lower frame members.

5. The body frame structure of claim 3, wherein each of said bracket members has a plurality of mounting portions supporting a rear frame member for mounting a seat of the vehicle thereto.

6. The body frame structure of claim 3, wherein said bracket members are connected to each other by at least one cross member made of aluminum or an alloy including aluminum.

7. The body frame structure of claim 6, wherein each of said at least one cross member has a support portion for supporting a swing arm.

8. The body frame structure of claim 7, wherein each of said bracket members has a boss integrally connected to a respective one of said at least one cross member, said boss protruding toward a center of the vehicle in a the width-wise direction, and said boss having an outer peripheral surface with a curved shape so as to be smoothly connected to a surface of a respective one of said bracket members.

9. The body frame structure of claim 1, wherein said lower frame members are arranged so as to open in a rearward V shape and to close toward each other at front ends thereof, a rear end of said front frame member and a front end of each of said lower frame members being connected via a joining member made of aluminum or an alloy including aluminum.

10. The body frame structure of claim 9, wherein said joining member comprises a molded joining member.

11. The body frame structure of claim 1, further comprising a joining bracket connecting said upper frame members to said front frame member, said joining bracket being fixed to a front end of said front frame member, said joining bracket being made of aluminum or an alloy including aluminum, and said joining bracket having a pair of fitting holes in which a front end of each of said upper frame members is respectively inserted.

12. The body frame structure of claim 1, wherein said front frame member is arranged at a center position of the vehicle in the width-wise direction, and said front frame member has support portions supporting right and left lower suspension arms suspending front wheels of the vehicle, said support portions being arranged at both right and left sides of said front frame member.

13. The body frame structure of claim 12, further comprising:
a pair of right and left center frame members extending rearward from front end portions of said upper frame members approximately in a longitudinal direction of the vehicle, said center frame members being made of aluminum or an alloy including aluminum and being located at a center position of said body frame in the width-wise direction; and
a suspension arm support bracket supporting right and left upper suspension arms suspending the front wheels, said lower suspension arms being bridged over said center frame members.

14. The body frame structure of claim 1, further comprising a steering shaft support bracket supporting a steering shaft at a front portion of the vehicle, said steering shaft support bracket being bridged over said upper frame members, said steering shaft support bracket being made of aluminum or an alloy including aluminum.

15. The body frame structure of claim 1, wherein each of said lower frame members has a cross sectional shape with a vertical length larger than a lateral length.

* * * * *